United States Patent

[11] 3,592,452

| [72] | Inventor | Surinder K. Katyal<br>Harwood Heights, Ill. |
|---|---|---|
| [21] | Appl. No. | 794,191 |
| [22] | Filed | Jan. 27, 1969 |
| [45] | Patented | July 13, 1971 |
| [73] | Assignee | Universal Oil Products Company<br>Des Plaines, Ill. |

[54] FLUID-CONTACTING DEVICE
3 Claims, 4 Drawing Figs.

[52] U.S. Cl. .................................................. 261/109,
261/113, 261/114, 23/270.5, 55/226
[51] Int. Cl. .................................................. B01f 3/04
[50] Field of Search .......................................... 261/114
VT, 62, 113, 109, 110, 111, 114; 23/270.5; 55/226

[56] References Cited
UNITED STATES PATENTS
| 868,603 | 10/1907 | Gartley ........................ | 261/113 |
| 1,176,747 | 3/1916 | Ferguson ..................... | 261/114 (VT) |
| 1,182,544 | 5/1916 | Ferguson ..................... | 261/62 X |
| 1,815,898 | 7/1931 | Brassert et al. ............. | 261/111 |
| 2,356,653 | 8/1944 | Cox .............................. | 261/111 |
| 2,695,773 | 11/1954 | McGrath ...................... | 261/DIG. 11 |
| 3,064,955 | 11/1962 | Boutte ......................... | 261/113 |
| 2,794,711 | 6/1957 | Hall et al. ................... | 23/270.5 |

FOREIGN PATENTS
| 1,253,686 | 1/1961 | France ........................ | 261/113 |
| 547,722 | 4/1932 | Germany ..................... | 261/114 VT |

*Primary Examiner*—Tim R. Miles
*Attorneys*—James R. Hoatson, Jr. and Joseph C. Mason, Jr.

ABSTRACT: Fluid-contacting device having means associated therewith for varying the open or hole area in a plate element.

3,592,452

INVENTOR.
Surinder K. Katyal
BY:
ATTORNEYS

FLUID-CONTACTING DEVICE

BACKGROUND OF THE INVENTION

This invention relates to a fluid-contacting device. It also relates to a contacting apparatus used for contacting two substantially immiscible or partially miscible liquids. It specifically relates to an improved perforated plate column for use in contacting fluids.

In many applications within the chemical and petroleum field it is desirable to contact two fluid phases which are characterized in that an interfacial tension exists between the two phases. The two fluids may be a liquid and a gas or two substantially immiscible liquids, such as gasoline and water. There are many applications wherein it is desirable to transfer material or energy between two such phases. Typical processes include, but are not necessarily limited to, fractionation, absorption, extraction, scrubbing, etc. In many of these applications some form of perforated plate or bubble deck is used through which one phase passes into the other phase. When many stages are required in order for sufficient contact to be effected or to obtain a particular equilibrium between the phases, the various contacting zones or devices are conveniently stacked one upon another in an elongated cylindrical vessel or tower which is divided into a series of zones by placing perforated plates across its cross section at regular intervals along its vertical axis. Adjacent zones in such a column are often connected by conduits passing through each perforated deck which conducts the undispersed fluid to the next contacting zone. On the other hand, in some applications towers are constructed without such conduits or downcomers with the passage of the phases being accomplished entirely by countercurrent flow through the perforations in a plate element.

Continuous multistage countercurrent liquid-liquid extraction is equally effected in a series of stages which are vertically disposed in a common shell as mentioned hereinabove. Each stage is contained between two perforated plates or their equivalent and, typically, each plate contains suitable conduit means for passing undispersed material between the stages. In such contact, one phase must be more dense than the other and substantially immiscible therewith. The contacting is effected by passing one phase generally upwardly through the column while the other phase is passed generally downward through the column. It is common practice for the continuous phase to flow laterally across each stage and then through the aforementioned conduit into the next stage while the discontinuous phase is broken into subdivided particles or droplets in passage through the perforations in each horizontal plate. Either the more dense or less dense phase may be continuous. For example, when the conduit members passing through each plate extend upwardly from each plate, the more dense phase is discontinuous and rains down through the perforations in the plate through the less dense phase immediately beneath. Conversely, when the conduits extend below each plate, the less dense phase is discontinuous and passes upwardly as droplets through the more dense phase.

Regardless of which phase is continuous and which is discontinuous, the limit of operability of a column, whether it is an extraction column or distillation column, is established by the open area in each perforated plate. The rate of flow of fluid through a perforated plate is proportional to the open area of the perforations, the head of liquid on each plate, and the general flow characteristics of the liquid. For any given fluid, therefore, and for any given plate, the flow rate can be increased only by varying the level of the interface in each stage. However, the height of each stage limits how much head can be obtained.

In many operations a considerable number of equilibrium contacting stages are required in order for a certain effect to be obtained. For example, in a liquid-liquid extraction process the equilibrium conditions in the stage are what determines the number of stages required. In many such processes equilibrium is readily obtained so that high tray efficiency is not a necessary requirement and in such processes high throughputs and flexibility of operation are of importance. In other processes it is highly desirable to maintain tray efficiency as high as possible even through the throughput through the column may vary over a wide range.

In conventional perforated plate designs the head available for mixing of the phases varies with the flow rate and hence the mixing intensity and extraction efficiency, for example, change with flow rate. It follows, therefore, that there is very little flexibility in the range of flow rates and in the rates of solvent-to-oil feed in conventional extraction column designs.

It would be desirable, therefore, to provide a perforated plate design which has wide flexibility in being able to furnish maximum head regardless of changes in flow rate. If such a device were applied to liquid-liquid extraction it would serve to control the interface at each plate. Accordingly, the disadvantages of the prior art schemes are overcome according to this invention by providing a novel tray design having associated therewith means for varying the open or hole area in a plate element.

SUMMARY OF THE INVENTION

Therefore, it is an object of this invention to provide an improved fluid-contacting device having means for varying the open or hole area in a plate element.

Accordingly, one embodiment of this invention provides a fluid-contacting device comprising, in combination, a fixed first perforated member comprising a first plate element containing a plurality of open slots unidirectionally traversing said plate from side to side; and, means for rotating said second member whereby the degree of registration of corresponding slots in each said member may be varied.

In essence, therefore, the present invention provides a fluid-contacting device having a fixed slotted plate in intimate contact with a second slotted plate which can be rotationally moved in a way to change the open area created by the intersecting slots. As will become evident from the discussion of the appended drawings, the upper plate element may be movable or the lower plate element may be movable.

DESCRIPTION OF THE DRAWINGS

The general construction and operation of the fluid-contacting device of this invention may be best described with reference to the accompanying drawings in which.

It is immediately evident that the configuration of the present fluid-contacting device differs remarkably from those of the prior art. The prior art contacting devices, including the perforated plate involve the use of pierced plates wherein a sheet of metal has been punched mechanically with a plurality of substantially circular holes. On the other hand, the configuration achieved by the superimposed tower plate elements having elongated slots in each element is substantially rectangular in nature varying, for example, from a square to an elongated parallelogram. In one embodiment of this invention, however, the movable member can have an equal number of slots as the fixed member as well as the same symmetry as the fixed member. In which case, the slots of each member can be made to coincide thereby creating a contacting device of maximum open area corresponding precisely to the open area represented by the sum of the slot areas of one element. Other embodiments of this invention include offsetting the slot area between the corresponding members in such a manner that rotation will provide minimum open area when the slots are aligned in the same direction with respect to each member. In other words, as those skilled in the art will be aware, the present invention provides maximum flexibility, not only from a design standpoint, but from an operational standpoint by providing means of varying the open area over a wide range of choices which can be selected according to predetermined changes in flow through the column.

DETAILED DESCRIPTION OF THE INVENTION

Figure 1:
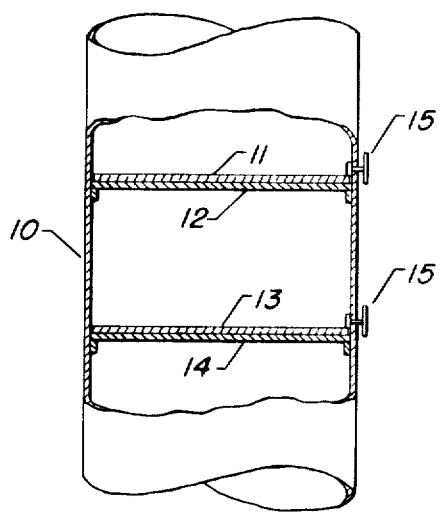
FIG. 1 is a partial sectional elevation of a liquid-liquid contacting tower showing the general arrangement of a plurality of fluid-contacting devices in such column.

Referring now to FIG. 1, the cutaway section indicates an extraction column 10 having a plurality of fluid-contacting devices each device consisting of upper members 11 and 13, and lower members 12 and 14, respectively, Item 15 represents a handwheel connecting with suitable gear means not shown for rotating upper members 11 and 13 relative to fixed members 12 and 14. A plurality of antifriction devices (not shown) may be placed between the movable and fixed elements as desired. Such devices may be of the ball bearing type or of "Teflon" gasket material which also provides a smooth surface for rotating the upper member against the fixed lower member. As previously mentioned, however, the rotational element may in some applications be reversed, to wit: the lower member may be rotated and the upper member fixed. Additionally, by means not shown, handle mechanism 15 may have associated therewith indicating devices which would indicate to the operator the precise position of each movable member.

Figure 2A:
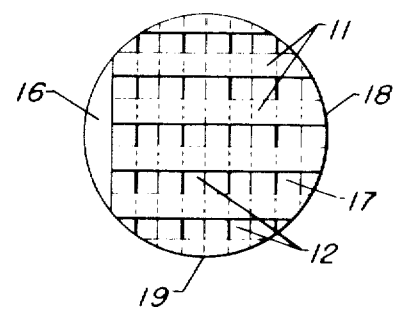
FIG. 2a is a traverse section of the column showing the general arrangement of the two plate elements relevant to each other.

As shown in FIG. 2a, a connecting conduit 16 is utilized as a passageway for the flow of the discontinuous phase from one contacting device to another. The slot area 18 unidirectionally traverses the column from side to side. These slots may result from the welding of thin metal strips of standard size to a ring mechanism, said ring operating as a bearing surface and structural member holding the metal strips which create slots 18. Similarly, slot 19 has been created by the welding of thin metal strips to a ring mechanism which is suitably fixed to the shell of the column by means not shown.

Figure 2B:
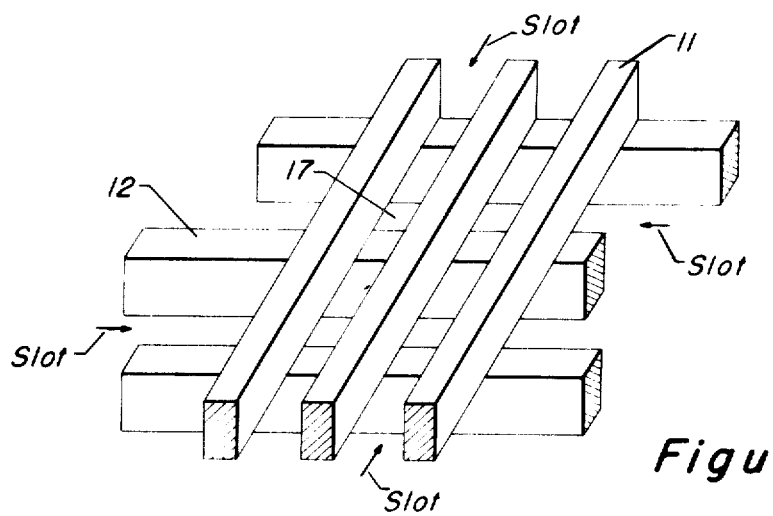
FIG. 2b is an enlarged section showing in detail the overlapping of the slotted areas between the two plate elements.

FIG. 2b represents the geometric configuration wherein upper member 11 has metal strips creating slots running substantially from side to side. The supporting ring has not been shown. Lower member 12 has a similar symmetry and provides slots also running unidirectionally from side to side.

Figure 3:
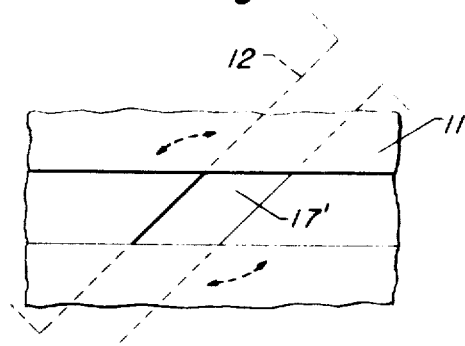
FIG. 3 is a plan view of the structure of FIG. 2b showing the change in the size of the open area when one perforated member has been rotated in a clockwise direction.

In mechanical operation, FIG. 3 demonstrates how the open slot area 17' would change with the rotation of lower member 12 in a clockwise direction. Other slot areas, of course, would be created depending upon the extent of rotation of either element 12 or element 11.

A specific embodiment of the use of the liquid-liquid contactor of this invention is its use in an extraction process. A typical process and one frequently employed is the removal of aromatic hydrocarbons from a mixture of hydrocarbons by extracting the aromatic hydrocarbons in an aqueous selective solvent. In such a process, the more dense phase is an aqueous phase containing a solvent, such as diethylene glycol or sulfolane. The selectivity of the solvent may be adjusted by increasing or decreasing its water content and when the selectivity is increased by adding greater quantities of water. The ability of the solvent to dissolve aromatic hydrocarbons is reduced so that greater throughputs of solvent are required to dissolve the same amount of material. However, a greater purity of product may be obtained with the same number of contacting stages and the other operational variables constant.

Similarly, in a distillation process, such as one which fractionates a hydrocarbon mixture into gasoline, gas oil, and the like, the present invention provides advantages over the prior art schemes whereby a single column can operate efficiently under variable vapor loads. In such an operation, the hydrocarbon vapors pass upwardly through the open slot area while the continuous liquid hydrocarbon phase passes either across the device and down through downcomers to the next device or passes in dropwise fashion down through the open area in countercurrent fashion to the upflowing hydrocarbon vapors.

A variety of mechanisms can be utilized to rotate the movable member according to the practice of the present invention. As previously mentioned, a hand-operated wheel which activates a suitable gear mechanism may be used satisfactorily. Of course, electrically powered gear mechanisms may also be used to rotate the movable member. It is within the concepts of this invention for each movable member within a given column to be able to be rotated through the same number of degrees or means may be provided for rotating each movable member independently and by a varying amount relative to every other member.

PREFERRED EMBODIMENT

Therefore, from the teachings presented herein, the present invention in its preferred embodiment provides a contacting apparatus which comprises, in combination: (a) a vertically disposed shell; (b) horizontally disposed fluid-contacting devices fixed within said shell in spaced relationship, each said device comprising, in combination, (i) a fixed first perforated member comprising a first plate element containing a plurality of open slots unidirectionally traversing said first plate from side to side, (ii) a movable second perforated member contiguous to said first member comprising second plate element containing a plurality of open slots unidirectionally traversing said second plate from side to side; and, (c) means for rotating each second member whereby the effective open area of corresponding slots may be varied.

As used herein, the term "contiguous to said first member" is intended to include a physical touching of the two perforated members or the separation of the two perforated members by suitable antifriction devices, such as gasketing material and/or roller bearings. However, the distance between the two perforate members comprising the fluid devices should not be great enough to permit flow of materials to any significant extent in the annulus between the two members. It is distinctly preferred that there be no passage of materials between the two members by way of gasket material and/or close tolerance construction.

I claim:

1. Contacting apparatus comprising in combination:
   a. a vertically disposed shell;
   b. horizontally disposed fluid-contacting devices fixed within said shell in spaced relationship, each said device comprising in combination
      i. a fixed first perforate member comprising a first plate element containing a plurality of parallel open slots unidirectionally traversing said first plate from side to side, said slots being separated by imperforate portions of said first plate element which are approximately as wide as the width of said slots;
      ii. a rotatable second perforate member contiguous to said first member comprising a second plate element containing a plurality of parallel open slots unidirectionally traversing said second plate from side to side, said slots being separated by imperforate portions of said second plate element which are approximately as wide as the width of said slots; and,
   c. means disposed externally of said shell and extending therethrough and operatively connecting with said second member for rotating each second member whereby the effective open area of corresponding slots may be varied.

2. Fluid-contacting device according to claim 1 wherein said open slots of said second member are substantially the same number and arrangement as said open slots of said first member.

3. The apparatus according to claim 1 wherein said rotatable second perforate member is superjacent said fixed first perforate member.